Oct. 19, 1948.                    D. R. FRY                    2,451,726
                DRY CELL DEPOLARIZING AND RECONDITIONING DEVICE
                            Filed Jan. 27, 1948

Inventor
Donald R. Fry
By
Clarence A. O'Brien
and Harvey B. Jacobson
Attorneys

Patented Oct. 19, 1948

2,451,726

UNITED STATES PATENT OFFICE 2,451,726

DRY CELL DEPOLARIZING AND RECONDITIONING DEVICE

Donald R. Fry, East Greenbush, N. Y.

Application January 27, 1948, Serial No. 4,687

6 Claims. (Cl. 320—4)

This invention relates to apparatus for reconditioning and depolarizing dry cell batteries of the type used in connection with flashlights, signaling apparatus, hearing aids and the like.

It is a well known fact that dry cell batteries are running down prematurely, if the sum total of the periods within which the battery is serviceable is considered as its "normal" service period. Especially continuous use through a protracted period, which however is only a fraction of the "normal" service period, exhausts a dry cell battery completely or almost completely and makes it unfit for further use. If long periods of rest are interposed between limited service periods the service period is lengthened, but is rarely extended so as to coincide with the maximum period of serviceability under more favorable conditions.

It has been found that such prematurely "exhausted" batteries may be reconditioned or revitalized by passing a direct current through them in the proper direction which causes depolarization. After such a reconditioning, revitalizing and depolarizing process the dry cell is again serviceable for a long time. This process may be repeated.

While depolarizing (removing the hydrogen accumulating at the positive electrode of the cell) or the revitalizing of the exhausted depolarizing substances which are part of the cell contents certainly plays an important part in the reconditioning process, it is unlikely that it is the sole factor which affects the reconditioning of the cell. This may be concluded from various electro-chemical processes which take place at the negative electrode and also from the fact that it has been found that an interrupted direct current has a better reconditioning effect than a continuous direct current.

In order to prolong the life of a dry cell battery which is in the hand of the user by means of a direct current passing through it, it is necessary to provide extremely simple inexpensive and foolproof apparatus, which may be used by persons having neither mechanical skill nor any knowledge enabling them to handle electrical apparatus. Any manipulation however simple, other than the connection with an electric outlet, prevents, however, any extension of the service period beyond the period of first exhaustion, as it requires return to a skilled or half skilled mechanic or dealer.

It is therefore the object of the present invention to provide such a simple inexpensive and foolproof apparatus which an unskilled person may either keep or carry with him and by means of which he can recondition his dry cell batteries repeatedly so as to extend their period of serviceability to a maximum.

It is a further object of the invention to provide an apparatus of this type which in most cases also produces an interrupted direct current.

It is a further object of the invention to provide an apparatus of this type which is equally well adapted for dry cells of different types such as the "A" and "B" batteries of hearing aids and portable radios.

Further and more specific objects will be explained or will be made apparent in the following detailed specification.

The invention is illustrated in the acccompanying drawing by way of example, the example showing the principle of the invention and the best mode in which it is contemplated applying this principle. This example supplies information to the expert sufficient to construct other embodiments of the invention, and modifications of the example shown are therefore not necessarily departures from the invention.

From the above explanation of the reconditioning process it will be clear that reconditioning of a cell requires the passing of a direct current, the intensity of which is not very material provided it does not damage the cell or cause overheating of the same.

The apparatus according to the invention therefore comprises a container 5, provided with a cover or lid 6, preferably hinged to the container as shown at 7. The container and lid may consist of plastics or any other insulating material.

Figure 1:
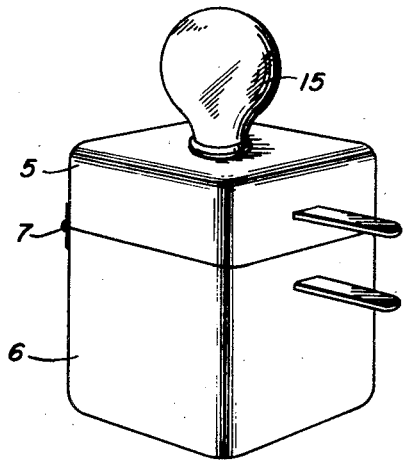
Figures 1 and 2 are perspective views of the apparatus when in closed and in open condition.
Figure 2:
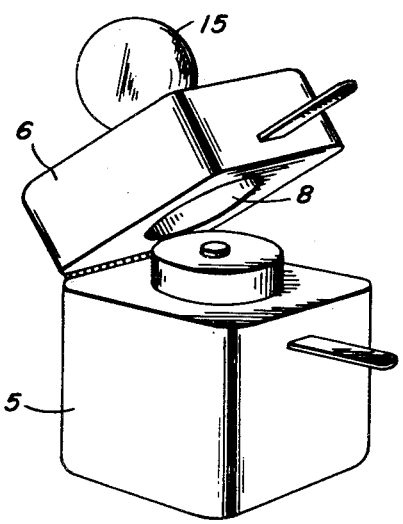
Figure 3:
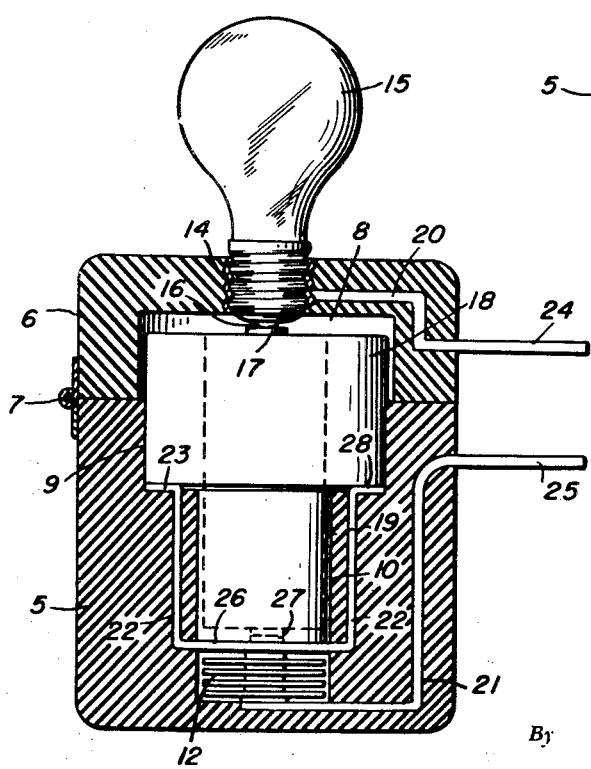
Figure 3 is a sectional elevational view the section being taken along the median plane.

The lid 6 as well as the container 7 are each provided with cavities 8, 9, 10, respectively. The cavity 8 provided in the lid is of a larger diameter and as seen in Figure 3 it matches the upper cavity 9 of the container 5. This cavity is of such a size that it can accommodate large size dry cells 18 which are of moderate height as a rule.

The lower cavity 10 of the container is of a smaller diameter and accommodates the small size dry cells 19 which are, as a rule, of greater length and which are indicated in dotted lines in Figure 3. Between the two cavities 9 and 10, a step 28 results on which the larger dry cell 18 may rest. At the bottom of the lower cavity a number of selenium rectifier cells 12 are placed, which fill the lowest part of the same.

The lid 6 carries a female threaded lamp socket 14, into which a lamp bulb 15 has been screwed. The central contact 16 of the male socket of the bulb projects into the cavity 8 and comes into contact with the central contact 17 of the dry cell 18 which has been placed into the said cavity.

The container and lid are preferably provided with conductor wires 20, 21 which have been molded into the plastic. One of these wires 20 which is enclosed within the insulating material of the lid 5 leads directly to a prong 24 projecting from the lid. Facing the prong 24 and at a distance therefrom which corresponds to the two female contacts of a standard socket connection is a second prong 25 projecting from the container 5. The two prongs 24, 25 therefore represent when the lid is closed a complete male connection which may be inserted into the socket.

Prong 25 is connected with wire 21 which is molded into the container and which leads to the end of the selenium cells 12.

Above the selenium cells a bridge piece 26 is arranged which may or may not be provided with a central projecting contact 27. This bridge piece is connected with conductors 22 which lead to the stepped portion 28 and which are provided with bent ends 23 upon which the dry cell 18 filling the cavity 9 rests.

Intermediate pieces which may or may not be provided with springs (not shown) may be added for cells which have an intermediate length, so as to secure their connection with the contacts 16 and 27 upon closure of the lid.

To recondition a dry cell for instance cell 18 it is placed into the cavity 9 (or 10) of the container 6, the lid is closed and the two prongs 24, 25 are simply placed into the socket of any connector. As a rule alternating current is used which passes through the cells 12 and through conductors 22, 23 to the cell. The selenium rectifier will rectify the current passing through it. As only one-half of the alternating current passes the current is pulsating. The current passes through the cell and through the bulb 15 which lights and offers a resistance limiting the current.

The user is fully protected, for when the prongs are in the socket, and the lamp bulb is lighted no current carrying part is exposed and if the lid is open it cannot be connected.

The use of an interrupted current, as above stated is to be preferred to a continuous current.

The inbuilt rectifier in the container fulfils the triple purpose of a rectifier, of a device producing a definite direction of current within the container and of an interrupter.

It will be clear that constructive changes or modifications of an unessential character will not affect the invention.

Having described the invention, what is claimed as new is:

1. A dry cell depolarizing and reconditioning device comprising a container provided with a cavity adapted to accommodate the dry cell to be reconditioned, a removable lid adapted to be joined to said container along an edge and closing said container cavity, a contact in the said lid, a further contact in said container, both contacts being arranged to come into contact with the electrodes of the dry cell to be reconditioned upon closure of the lid, prongs for making electric contact projecting from the lid and the container respectively, conductors to connect each of said contacts with one of said prongs, said prongs being arranged for direct insertion into a standard connector socket, upon closure of the lid.

2. A dry cell depolarizing and reconditioning device comprising a container provided with a cavity adapted to accommodate the dry cell to be reconditioned, a removable lid adapted to be joined to said container along an edge and closing said container cavity, a lamp socket and a lamp bulb in said lid, a rectifier cell arrangement in said container, a contact electrically connected with said lamp bulb, said lid and a further contact connected with said rectifier cell arrangement in the container, prongs for making electric contact projecting from the lid and the container respectively, conductors to connect each of said contacts with one of said prongs, said prongs being arranged for direct insertion into a standard connector socket, upon closure of the lid.

3. A dry cell depolarizing and reconditioning device comprising a container provided with a cavity adapted to accommodate the dry cell to be reconditioned, a removable lid adapted to be joined to said container along an edge and closing said container cavity, a lamp socket and a lamp bulb in said lid, a selenium rectifier cell arrangement in said container, a conductor embedded in said lid, leading from said lamp socket, a further conductor embedded in said container leading to the inlet end of said rectifier cell arrangement, a contact in operative connection with said lamp bulb projecting from said lid, a further contact in operative connection with the outlet end of the rectifier cell arrangement, a pair of prongs located on and projecting from the two sides of the joining edges of the lid and container respectively at a distance corresponding, upon closure of the lid, to the standard distance of electric connector members and adapted to be inserted into such a connector member, the prongs being joined to the conductors embedded in the lid and in the container respectively.

4. A dry cell depolarizing and reconditioning device as claimed in claim 2 in which the cavity in the container is stepped and comprises a portion of larger diameter and a portion of smaller diameter, the former being arranged nearer to the lid and the extension, housing at its bottom the rectifier cell arrangement.

5. A dry cell depolarizing and reconditioning device, comprising a container provided with a stepped central cavity, one of said central cavities being of a larger diameter and a smaller depth than the other said cavities being adapted to accommodate dry cells of different sizes, a closable lid provided with a cavity, forming a continuation of the cavity of larger diameter in the container when closed, a contact on said lid, a further contact in the container near the bottom end of said cavity of smaller diameter, said contacts being adapted to come into electric contact with the electrodes of the dry cell upon closure of the lid, conductors leading from the contact in the container to the stepped portion of the cavity, said conductors having bent ends in the plane of said stepped portion, prongs for making electric contact projecting from the lid and the container respectively, conductors to connect each of said contacts with one of said prongs, said prongs being arranged for direct insertion into a standard connector socket, upon closure of the lid.

6. In a dry cell depolarizer and reconditioner device, a closable container with a movable lid both provided with cavities, adapted to accommodate dry cells to be reconditioned, contact means in said lid and container, adapted to come into electric contact with the cell electrodes upon closure of the lid, and contact making connector elements on said closable container and movable lid, adapted to be brought into a parallel relation and to be inserted into a standard connector upon closure of the container.

DONALD R. FRY.

No references cited.